United States Patent
Martín Gómez

(10) Patent No.: US 10,996,136 B2
(45) Date of Patent: May 4, 2021

(54) AIR TO AIR REFUELING HOSE AND METHOD FOR DETECTING DAMAGE IN AIR TO AIR REFUELING HOSE

(71) Applicant: Airbus Defence and Space, S.A.U., Getafe (ES)

(72) Inventor: Gonzalo Martín Gómez, Getafe (ES)

(73) Assignee: AIRBUS DEFENCE AND SPACE, S.A.U., Getafe (ES)

( * ) Notice: Subject to any disclaimer, the term of this patent is extended or adjusted under 35 U.S.C. 154(b) by 27 days.

(21) Appl. No.: 16/444,307

(22) Filed: Jun. 18, 2019

(65) Prior Publication Data

US 2019/0383694 A1 Dec. 19, 2019

(30) Foreign Application Priority Data

Jun. 19, 2018 (EP) .................................... 18382438

(51) Int. Cl.
*G01M 3/40* (2006.01)
*F16L 11/08* (2006.01)

(52) U.S. Cl.
CPC ............. *G01M 3/40* (2013.01); *F16L 11/088* (2013.01)

(58) Field of Classification Search
None
See application file for complete search history.

(56) References Cited

U.S. PATENT DOCUMENTS

| | | | |
|---|---|---|---|
| 5,539,624 A | 7/1996 | Dougherty | |
| 9,296,486 B2 | 3/2016 | Gimenez Abad | |
| 10,267,439 B2 | 4/2019 | Pryce et al. | |
| 2004/0065377 A1 | 4/2004 | Whiteley | |
| 2004/0256016 A1* | 12/2004 | Arima ................. | B29D 23/001 138/126 |
| 2006/0196252 A1 | 9/2006 | Deckard | |
| 2007/0102583 A1* | 5/2007 | Cutler .................. | F16L 55/027 244/135 A |
| 2008/0185063 A1* | 8/2008 | Bieszczad ............ | F16L 11/085 138/126 |
| 2010/0174495 A1 | 7/2010 | Pereira et al. | |
| 2010/0288390 A1 | 11/2010 | Colbachini | |
| 2014/0346279 A1 | 11/2014 | Foo et al. | |
| 2017/0241576 A1* | 8/2017 | Pryce ..................... | B60L 53/18 |

FOREIGN PATENT DOCUMENTS

| | | |
|---|---|---|
| EP | 2251192 A1 | 11/2010 |
| EP | 2644509 A2 | 10/2013 |
| EP | 2738097 A1 | 6/2014 |

\* cited by examiner

*Primary Examiner* — Jas A Sanghera
(74) *Attorney, Agent, or Firm* — Greer, Burns & Crain, Ltd.

(57) ABSTRACT

An air to air refueling hose for an aircraft comprises an internal structure suitable for transporting fuel inside, an intermediate structure arranged around the internal structure, and an external structure arranged around the intermediate structure such that the intermediate structure is located between the internal structure and the external structure, and a sensing arrangement comprising electric conductors arranged along the air to air refueling hose and embedded inside of the external structure.

17 Claims, 4 Drawing Sheets

AIR TO AIR REFUELING HOSE AND METHOD FOR DETECTING DAMAGE IN AIR TO AIR REFUELING HOSE

CROSS-REFERENCES TO RELATED APPLICATIONS

This application claims the benefit of the European patent application No. 18382438.2 filed on Jun. 19, 2018, the entire disclosures of which are incorporated herein by way of reference.

FIELD OF THE INVENTION

The present invention belongs to the field of air to air refueling for aircraft, in particular to the field of systems for monitoring the degradation status of an air to air refueling hose of a tanker aircraft.

BACKGROUND OF THE INVENTION

Air to air refueling is a very complex operation, as both the tanker and the receiver aircraft are flying, and this fact raises a large number of circumstances that may disturb the positioning of the aircraft: speed of aircraft, swirls, clouds, etc. Further, the extremely narrow tolerance allowed in this operation makes it quite delicate.

Several systems may be used for refueling. One of the most often used is the hose and drogue. A tanker aircraft comprises a hose to provide fuel to a receiver aircraft. Before starting the refueling process, the hose is wrapped in a drum located in the tanker aircraft. A drogue and a coupling are both attached at the end of the hose to provide the necessary drag force and to allow the receiver aircraft probe connection.

The drogue and coupling of a hose could be damaged by impacts with the receiver aircraft probe while attempting to contact. The hose may be damaged because of friction with previous hose turns or by wear against adjacent structure while wrapping in the drum. This damage can occur in flight or after the hose being extended for maintenance or visual inspections, where there is an additional risk of the hose being damaged by friction with the pavement or ground support equipment being used for this operation. In any of these cases, a damaged hose may have negative effects in safety or aircraft refueling operation.

Therefore, the air to air refueling hose needs to be periodically checked to confirm the absence of damage. This periodic check is usually done by visual inspection which requires the hose to be fully extended.

In addition to visual inspection, several other inspection methods are being investigated to evaluate their capability to identify hose internal damage, for example, eddy current inspection. However, this method also requires the hose to be extended and it is not valid to identify damage in the hose end fitting areas.

Visual inspections are done to check the absence of dangerous damage in the hose which could cause a fuel leak or affect the structural integrity of the hose which could end in a hose detachment in flight.

These known visual inspection methods present the following disadvantages:

The internal structure of the hose can be degraded (broken or corroded) without being detectable by external visual inspections, thus, hidden damage is not detectable. Further, this damage may cause hose rupture in flight and consequently the receiving aircraft may suffer impact due to the detached hose.

These methods require the work of several people to carry out the hose inspection.

These inspection methods require the effort of many people to move hose loads, for extending it and retracting it. Further, this could cause injury to the people involved in those activities.

In addition to added workload and time consumption for maintenance staff, extension and retraction of the hose affects aircraft schedule.

Sometimes tension done by the ground people to manually extend/rewind the hose cannot be controlled and there is a risk to incorrectly wrap the hose in the drum after being extended for inspection. Therefore, damage at hose retraction is not detectable.

Furthermore, friction to ground support equipment may also cause large hose damage, thus reducing the hose life.

Therefore, the present invention provides an improved hose with a monitoring system to check the hose damage, mainly without the need to extend the hose for inspecting it.

SUMMARY OF THE INVENTION

The present invention provides a solution for the aforementioned problems, by an air to air refueling hose.

In a first inventive aspect, the present invention provides an air to air refueling hose comprising:
- an internal structure suitable for transporting fuel inside,
- an intermediate structure arranged around the internal structure, and
- an external structure arranged around the intermediate structure in such a way that the intermediate structure is located between the internal structure and the external structure, wherein the air to air refueling hose further comprises sensing means arranged along the air to air refueling hose and embedded inside of the external structure, and wherein the sensing means are electric conductors.

The present hose is intended to supply fuel from one aircraft (tanker aircraft) to another aircraft (receiver aircraft). That is to say, the fuel is driven inside the internal structure of the air to air refueling hose from the tanker aircraft to the receiver aircraft. The present hose will be understood as a hose structure comprising end fittings in each end of the hose structure. The air to air refueling hose is suitable to be installed in an aircraft which will be understood as a tanker aircraft.

In a particular embodiment, when the air to air refueling hose is extended "tensed" it will be understood that the hose is extended along a longitudinal axis that runs from one end of the hose to the other end. The expression "tensed" will be understood as the position in which the hose is arranged with its entire structure being coaxial to such longitudinal axis.

The present air to air refueling hose is formed by a plurality of structures, one inside the other. These structures will be understood as cylindrical structures coaxial to the longitudinal axis when the hose is extended "tensed." These structures may be made of materials having different rigidity. Preferably, the rigidity of the intermediate structure is greater than the rigidity of the internal structure and the rigidity of the external structure. In a particular embodiment, the intermediate structure is a rigid or semi-rigid structure. Since the air to air refueling hose may be subjected to loads in operative activities, such rigid or semi-rigid intermediate structure is advantageously resistant to axial and/or radial forces. The internal structure and the external structure of the air to air refueling hose provide the hose with sufficient imperviousness and flexibility together with the rigidity of the intermediate structure for the supply operation to be effective.

The present air to air refueling hose comprises a sensing means suitable for detecting damage in the air to air refueling hose. The sensing means is arranged along the air to air refueling hose and embedded in the external structure. The external structure comprises an internal surface faced to the intermediate structure, and an external surface opposite the internal surface. The sensing means is arranged along the external structure and embedded inside such external structure, i.e., the sensing means is arranged between the external surface and the internal surface of the external structure of the hose.

The present air to air refueling hose is configured to transmit current along the sensing means in such a way that the electrical continuity along the sensing means can be measured and/or monitored by a monitoring system.

Advantageously, if there is damage in the hose affecting the sensing means when electric current is transmitted along the sensing means, such electric current is stopped or broken as a result of the damage. Thus, detection of an electric current break or stoppage by means of the sensing means is indicative of the presence of damage in the air to air refueling hose.

Advantageously, the sensing means are able to detect hidden damage in the hose, as well as physical damage (wear, cracks . . . ) or chemical damage (corrosion), for example breaks in any of the structures of such hose, leaks in the internal structure and breaks by corrosion caused by water ingest. That is to say, any hose significant damage would affect the sensing means arranged along such hose and embedded inside the external structure, and consequently this damage would be detected.

Furthermore, the sensing means installed in the air to air refueling hose does not need such hose to be extended for inspection. Advantageously, the present sensing means avoid the need to extend and retract the hose to be inspected and also avoid personal injury caused by this practice.

The installation of the sensing means in the present hose, advantageously, provides cost saving considering the reduction in flight line maintenance personnel and people-hours dedicated to this task along the operative life of a tanker aircraft where the present air to air refueling hose is installed.

Additionally, the present air to air refueling hose advantageously provides a more effective and quick inspection method to identify any damage in such hose, thus improving the aircraft dispatch reliability and operational availability.

In a particular embodiment, the sensing means comprise at least a first wire wound along and embedded inside the external structure.

In this particular embodiment, the first wire is wound along the external structure and also embedded into the external structure. This first wound wire is arranged inside the hose external structure forming an intermediate envelope surface inside of such external structure. Advantageously it allows the entire length of the hose to be covered by the sensor means for detecting damage.

In a particular embodiment, the first wire is helically wound inside the external structure.

The helical winding of the sensing means may be advantageously provided during the manufacture of the hose in a simple way.

In a particular embodiment, the air to air refueling hose comprises a plurality of layers of sensing means embedded inside of the external structure, wherein the plurality of layers of sensing means are electrically isolated between them.

The plurality of layers of sensing means provides a plurality of intermediate envelope surfaces of sensing means at different hose depth levels of the external structure. Advantageously, the plurality of layers of sensing means allows detecting damage at different depths, as well as detecting the extension in depth of the damage. In a particular embodiment, wherein the sensing means are a first wound wire, the plurality of layers of sensing means are a plurality of first wound wires being arranged coaxially to one another as well as to the structures of the hose or the surfaces of the external structure.

In a particular embodiment, the internal structure and the external structure are made of non-conductive materials, preferably of rubber. Advantageously, the rubber gives flexibility to the present air to air refueling hose.

In a particular embodiment, the intermediate structure is made of metal, preferably non-stainless steel. Advantageously, the metal gives rigidity to the present air to air refueling hose. Further, the non-stainless steel gives better adhesion between the intermediate structure and the external and internal structure.

In a particular embodiment, the intermediate structure comprises:
  a support wire wound along the internal structure, and
  a braid mesh arranged around the support wire.

The support wire is located between the braid mesh and the internal structure. Advantageously, this support wire of the intermediate structure avoids the braid mesh from radially compressing the internal structure, and also is resistant to the radial strength. Further, the braid mesh advantageously is resistant to the axial and radial strength.

In a particular embodiment, the braid mesh comprises a plurality of braided wires. In a more particular embodiment, the braid mesh is made of metal, preferably non-stainless steel. Advantageously, as previously mentioned, the non-stainless steel provides better mechanical properties, for example higher adhesion between the braid mesh and the rubber of the external structure.

In a particular embodiment, the braid mesh has the same characteristics as the sensing means, for example, the braid mesh is made of the same material as the sensing means. In this embodiment, measurement of an increased resistance along the sensing means associated to corrosion of the sensing means, or complete loss of electrical continuity, may be indicative of corrosion in the braid mesh.

In a particular embodiment, the support wire is helically wound along the internal structure between the braid mesh and the internal structure. The helically wound support wire is coaxial to the longitudinal axis when the hose is extended "tensed."

In a particular embodiment, the air to air refueling hose comprises two ends and two electrical terminals, each electrical terminal arranged at one end of the hose, both electrical terminals being connected to the sensing means and being configured to measure the electrical continuity along the sensing means.

In a particular embodiment, the air to air refueling hose comprises two ends and two electrical terminals, both electrical terminals arranged at one end of the hose, both electrical terminals being connected to the sensing means and being configured to measure the electrical continuity along the sensing means.

These electrical terminals are configured to transmit an electric current from a monitoring system and/or measurement equipment to the sensing means installed in the present air to air refueling hose.

In a particular embodiment, the monitoring system and/or measurement equipment is moved by an operator to the air to air refueling hose and connected to the electrical terminals in order to monitor and/or measure potential/possible damage in the hose.

In a second inventive aspect, the present invention provides an aircraft comprising an air to air refueling hose according to the first inventive aspect.

In a particular embodiment, the aircraft comprises a monitoring system, the monitoring system being connected to the electrical terminals of the sensing means and being configured to measure the electrical continuity along the sensing means.

Advantageously, the monitoring system can measure and monitor the detected damage in the air to air refueling hose. In a particular embodiment, the monitoring system and/or measurement equipment is located in the tanker aircraft and is configured to be controlled from the cockpit. In an embodiment the monitoring system is configured to continuously monitor the electrical continuity through the sensing means.

In a particular embodiment, the aircraft is a tanker aircraft.

In a third inventive aspect, the present invention provides a method for detecting damage in an air to air refueling hose according to the first inventive aspect, the method comprising the following steps:

a) providing an electrical current through the sensing means of the air to air refueling hose, and b) measuring the electrical continuity along the sensing means, wherein an electrical discontinuity in the measurement is indicative of a damage in the air to air refueling hose.

In a particular embodiment, the step a) further comprises providing an electrical current through one of the electrical terminals of the sensing means of the air to air refueling hose.

In a particular embodiment, the method is carried out by monitoring system and/or measurement equipment. In a more particular embodiment, the monitoring system and/or measurement equipment are installed in the tanker aircraft and the measurement is a remote measurement. In another particular embodiment, the monitoring system and/or measurement equipment is provided by an operator and the measurement is performed manually.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE PREFERRED EMBODIMENTS

Figure 1:
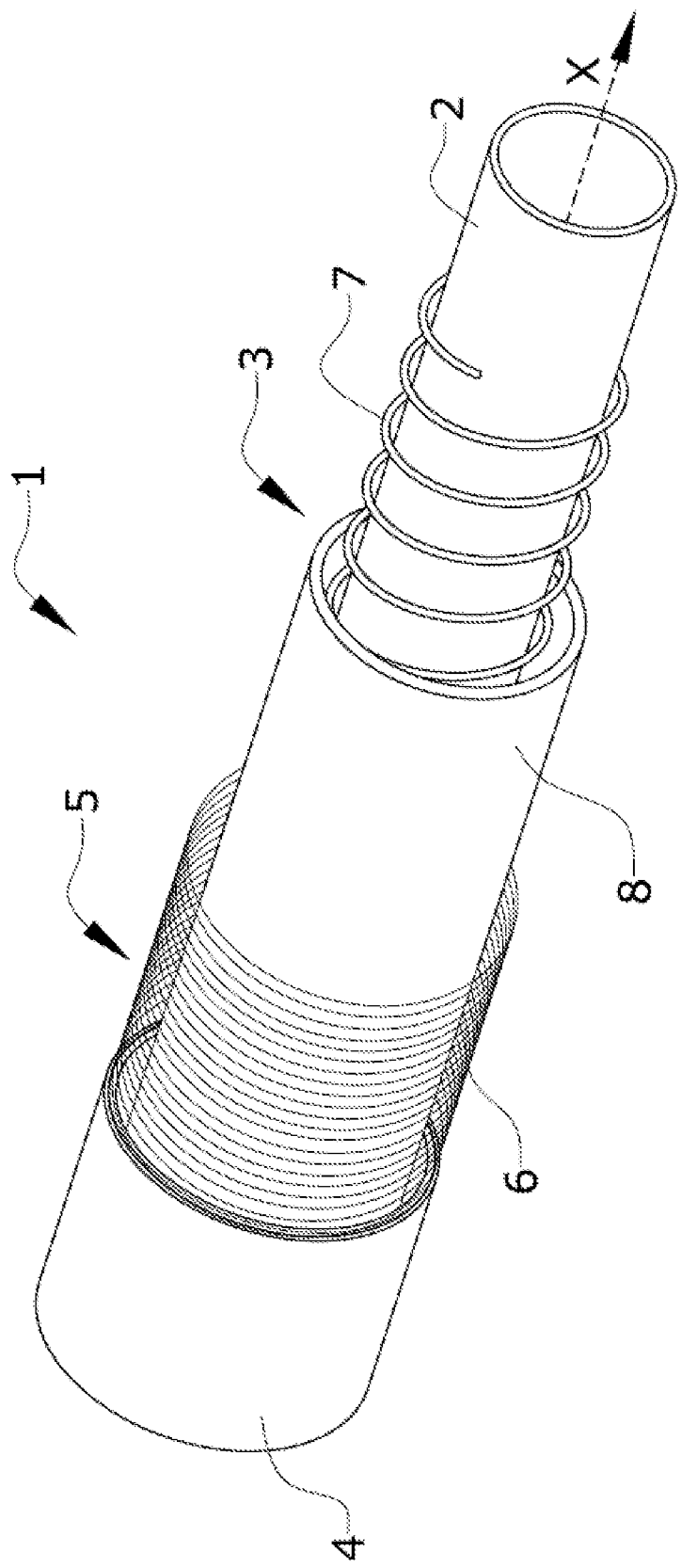
FIG. 1 shows a schematic perspective view of a portion of an air to air refueling hose according to an embodiment of the present invention.

FIG. 1 shows a schematic view of a portion of an air to air refueling hose (1) according to the present invention, in particular, when the hose (1) is extended. The hose (1) comprises an internal structure (2) suitable for transporting fuel inside from a tanker aircraft to an aircraft in flight. The internal structure (2) is a cylindrical structure arranged along the longitudinal axis (X) when the hose (1) is extended. The hose (1) further comprises an intermediate structure (3) arranged around the internal structure (2) and an external structure (4) arranged around the intermediate structure (3). When the hose (1) is completely extended or partially extended, that is to say, when the hose (1) is "tensed," the internal structure (2), the intermediate structure (3) and the external structure (4) are coaxial to the longitudinal axis (X). The external structure (4) advantageously protects the hose (1) from the outside.

FIG. 1 further shows a sensing means (5) comprising a first wire (6) arranged helically wound and embedded inside of the external structure (4). In this embodiment, when the hose (1) is completely extended or partially extended "tensed," the first wire (6) of the sensing means (5) is also coaxially arranged to the longitudinal axis (X).

In this embodiment the intermediate structure (3) comprises a support wire (7) helically wound along the internal structure (2), and a braid mesh (8) arranged around the support wire (7). The braid mesh (8) forms a cylindrical structure of braided wires which surrounds the support wire (7) and the internal structure (2). The external structure (4) surrounds the braid mesh (8) and consequently surrounds also the support wire (7) and the internal structure (2).

Figure 2:
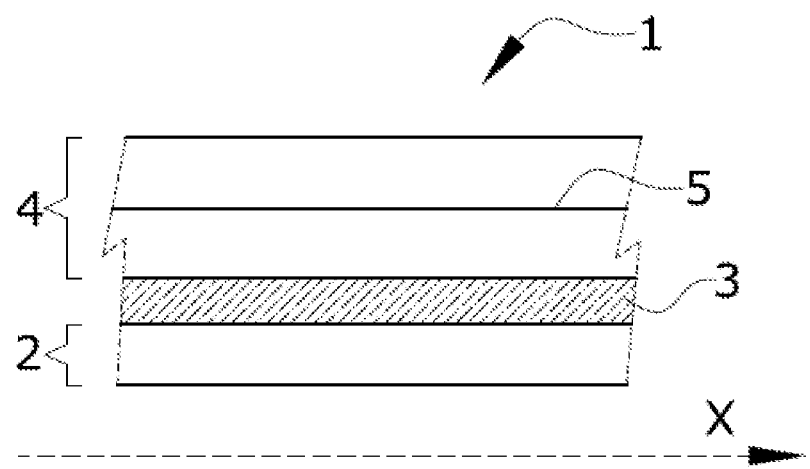
FIG. 2 shows a schematic cross sectional view of a portion of an air to air refueling hose according to an embodiment of the present invention.
Figure 3:
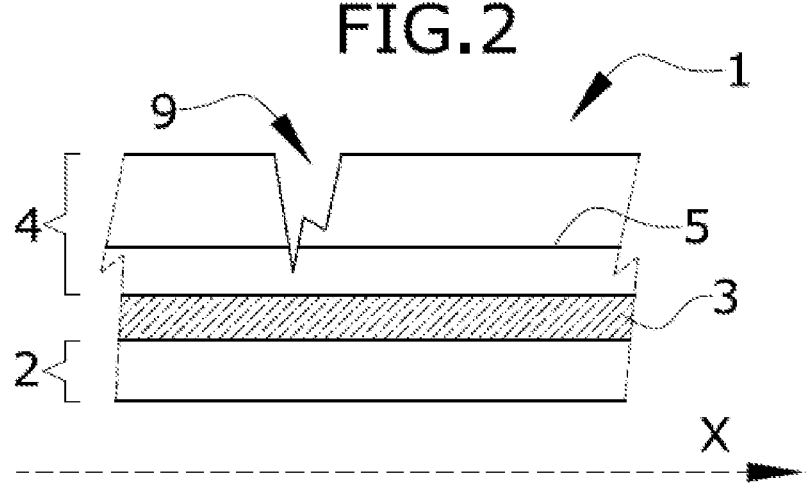
FIG. 3 shows a schematic cross sectional view of a portion of an air to air refueling hose according to an embodiment of the present invention.
Figure 4:
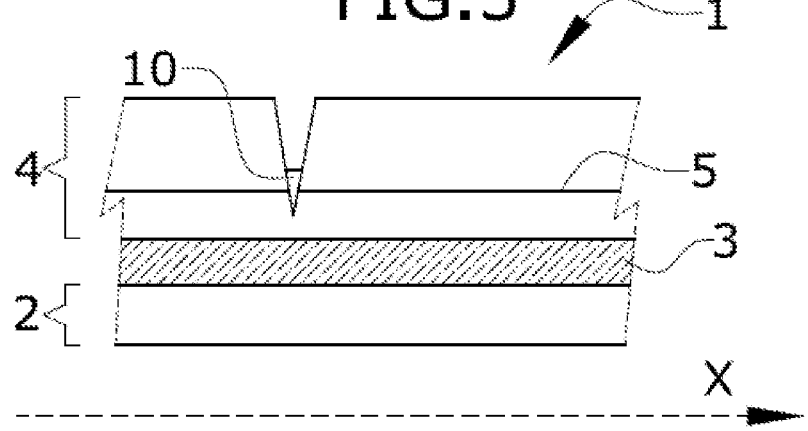
FIG. 4 shows a schematic cross sectional view of a portion of an air to air refueling hose according to an embodiment of the present invention.

FIGS. 2 to 4 show a schematic cross sectional view of a portion of an air to air refueling hose (1) according to FIG. 1. These figures show different structural layers of the present hose (1), that is to say, the hose (1) comprising from the longitudinal axis (X) an internal structure (2), an intermediate structure (3), and an external structure (4) comprising sensing means (5) embedded inside.

In FIG. 3 there is shown a damaged hose (1), in particular the hose (1) having a mechanical damage (crack, wear, abrasion, . . . ) (9) in the external structure (4) which reaches the sensing means (5). Thus, according to the present invention, when an electric current is driven along the sensing means (5), the electrical continuity of such current will be broken by the mechanical damage (9). Electrical discontinuity along the sensing means (5) can be detected by a monitoring system and is indicative of a damage existing in the hose (1).

In FIG. 4 there is shown a damaged hose (1), in particular the hose (1) having corrosive damage (humidity, salt, . . . ) (10) seeped into the external structure (4) which reaches the sensing means (5). Thus, according to the present invention, when an electric current is driven along the sensing means (5), the electrical continuity of such current will be broken because of the sensing means rupture caused by corrosive damage (10).

Figure 5:
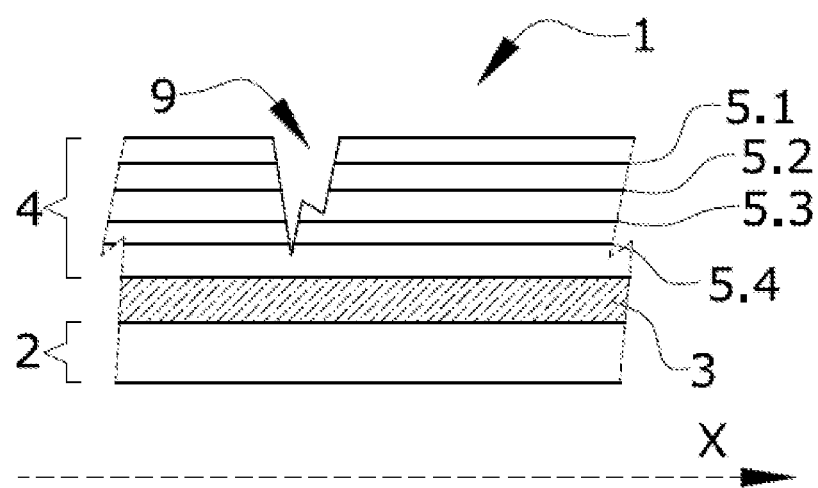
FIG. 5 shows a schematic cross sectional view of a portion of an air to air refueling hose according to an embodiment of the present invention.

FIG. 5 shows a schematic cross sectional view of a portion of an air to air refueling hose (1). This figure shows different structural layers of the present hose (1), that is to say, the hose (1) comprising from the longitudinal axis (X) an internal structure (2), an intermediate structure (3) and an external structure (4) comprising a plurality of sensing means (5.1, 5.2, 5.3, 5.4). In FIG. 5 there is also shown a damaged hose (1). In particular, the hose (1) has a mechanical damage (9), such as crack, wear or abrasion in the external structure (4) which reaches the two sensing means (5.1, 5.2) closest to the external surface of the external structure. Thus, according to this embodiment, when an electric current is driven along the first (5.1) and second (5.2) sensing means, the electrical continuity of such current will be broken by the mechanical damage (9). On the other hand, since the third (5.3) and fourth (5.4) sensing means are not affected by the mechanical damage (9), when an electric current is driven along the third (5.3) and fourth (5.4) sensing means, the electrical continuity of such current will not be broken. Electrical discontinuity along the sensing means (5.1, 5.2) can be detected by a monitoring system and is indicative of a damage existing in the hose (1). In this example, detection of electrical discontinuity in the first (5.1) and second (5.2) sensing means and not in the third (5.3) and fourth (5.4) sensing means is indicative of the depth of the mechanical damage (9) affecting the hose (1).

Figure 6:
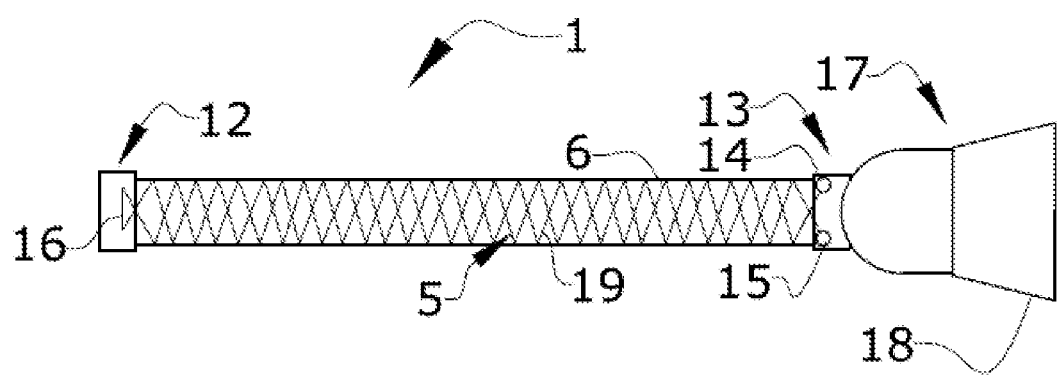
FIG. 6 shows a schematic view of an air to air refueling hose on which a method for detecting damage in the hose is carried out by a manual measurement according to an embodiment of the present invention.
Figure 7:
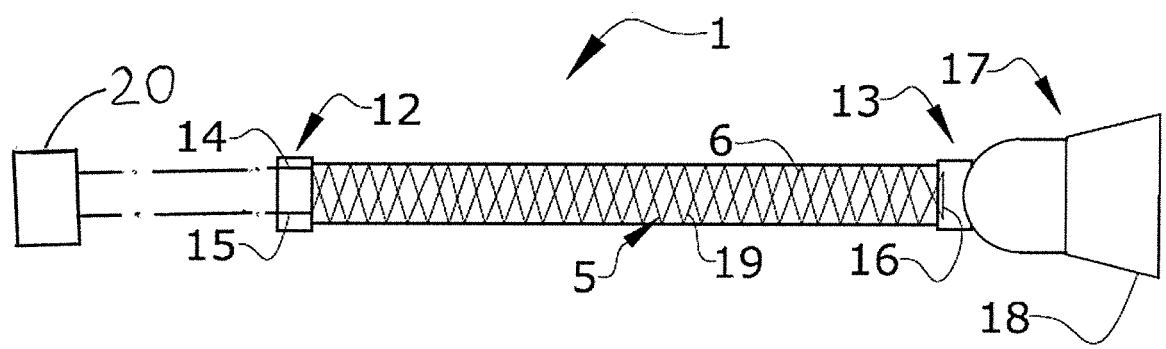
FIG. 7 shows a schematic view of an air to air refueling hose on which a method for detecting damage in the hose is carried out by a remote measurement according to an embodiment of the present invention.

The present invention also provides a method for detecting damage in an air to air refueling hose (1) as shown in FIGS. 6 and 7. The method comprises the following steps:

a) providing an electrical current through the sensing means (5) of the air to air refueling hose (1), and b) measuring the electrical continuity along the sensing means (5), wherein an electrical discontinuity in the measurement is indicative of a damage in the air to air refueling hose (1).

Figure 8:
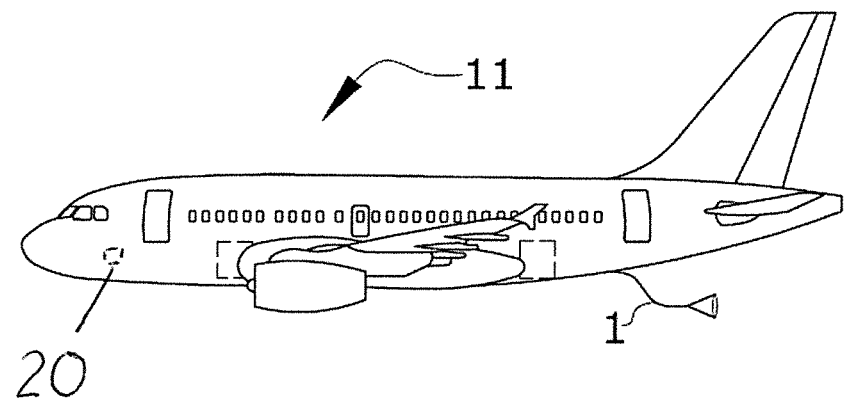
FIG. 8 shows an aircraft comprising an air to air refueling hose according to an embodiment of the present invention.

FIGS. 6 and 7 show a schematic view of an air to air refueling hose (1) comprising a first end (12) and a second end (13), and a drogue (17) comprising a coupling element (18) that is suitable to be connected to a probe comprised in a receiving aircraft. The first end (12) corresponds to the hose end attached to a tanker aircraft (11) (as shown in FIG. 8). The second end (13) corresponds to the hose end opposite to the first end (12), the second end (13) being attached to the drogue (17).

FIG. 6 shows a particular example of the air to air refueling hose (1) wherein the method for detecting damage in such air to air refueling hose (1) is carried out manually. In particular, both electrical terminals (14, 15) of the hose (1) are located in the second end (13) of the hose (1) and are both connected to the sensing means (5). The sensing means (5) comprises a first wire (6) and a second wire (19) arranged along the hose (1) in such a way that a first path of the sensing means (5) (first wire (6)) goes from the first electrical terminal (14) to the first end (12) of the hose (1), and a second path of the sensing means (5) (second wire (19)) goes from the second electrical terminal (15) to the first end (12) of the hose (1). Both wires (6, 19) of the sensing means (5) are connected in the first end (12) of the hose (1) by an end connection (16). Thus, the manual measurement is carried out on the hose (1) shown in FIG. 6 by: (i) providing a monitoring system and/or measurement equipment; (ii) connecting such system or equipment to both electrical terminals (14, 15); (iii) providing an electrical current to the sensing means (5) through one of such electrical terminals (14, 15); and (iv) measuring the electrical continuity along such sensing means (5).

In FIG. 6, in order to manually measure the electrical continuity along the air to air refueling hose (1), the electrical current provided from one of the electrical terminals (14, 15) goes through one of the wires (6, 19) of the sensing means (5) to the first end (12) and there goes through the other wire (6, 19) to the other electrical terminal (14, 15).

FIG. 7 shows a particular example of the air to air refueling hose (1) wherein the method for detecting damage in such air to air refueling hose (1) is carried out in remote. In particular, both electrical terminals (14, 15) of the hose (1) are located in the first end (12) of the hose (1) and are both connected to the sensing means (5). The sensing means (5) comprises a first wire (6) and a second wire (19) arranged along the hose (1) in such a way that a first path of the sensing means (5) (first wire (6)) goes from the first electrical terminal (14) to the second end (13) of the hose (1), and a second path of the sensing means (5) (second wire (19)) goes from the second electrical terminal (15) to the second end (13) of the hose (1). Both wires (6, 19) of the sensing means (5) are connected in the second end (13) of the hose (1) by an end connection (16). Thus, the remote measurement is carried out on the hose (1) shown in FIG. 7 by a monitoring system and/or measurement equipment (20) installed in an aircraft (11) in such a way that the following steps are carried out: (i) providing an electrical current to the sensing means (5) through one of such electrical terminals (14, 15); and (ii) remote measuring the electrical continuity along such sensing means (5).

In FIG. 7, in order to remote measure the electrical continuity along the air to air refueling hose (1), the electrical current provided from one of the electrical terminals (14, 15) goes through one of the wires (6, 19) of the sensing means (5) to the second end (13) and there goes through the other wire (6, 19) to the other electrical terminal (14, 15).

FIG. 8 shows a tanker aircraft (11) comprising an air to air refueling hose (1) according to the present invention. Further, the aircraft comprises a monitoring system (20) configured to measure and monitor the damage in the hose (1) detected by the sensing means (5) installed in such hose (1).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An air to air refueling hose for an aircraft comprising:
an internal structure suitable for transporting fuel inside,
an intermediate structure arranged around the internal structure,
an external structure arranged around the intermediate structure in such a way that the intermediate structure is located between the internal structure and the external structure,
sensing means comprising electric conductors arranged along the air to air refueling hose and embedded inside of the external structure, and
two electrical terminals, both electrical terminals being connected to the sensing means and being configured to measure an electrical continuity along the sensing means.

2. The air to air refueling hose according to claim 1, wherein the sensing means comprise at least a first wire wound along and embedded inside the external structure.

3. The air to air refueling hose according to claim 2, wherein the first wire is helically wound inside the external structure.

4. The air to air refueling hose according to claim 1, wherein the air to air refueling hose comprises a plurality of layers of sensing means embedded inside of the external structure, wherein the plurality of layers of sensing means are electrically isolated between them.

5. The air to air refueling hose according to claim 1, wherein the internal structure and the external structure are made of non-conductive materials.

6. The air to air refueling hose according to claim 5, wherein the non-conductive materials comprise rubber.

7. The air to air refueling hose according to claim 1, wherein the intermediate structure is made of metal.

8. The air to air refueling hose according to claim 7, wherein the metal of the intermediate structure is non-stainless steel.

9. The air to air refueling hose according to claim 1, wherein the intermediate structure comprises:
a support wire wound along the internal structure, and
a braid mesh arranged around the support wire.

10. The air to air refueling hose according to claim 9, wherein the braid mesh comprises a plurality of braided wires.

11. The air to air refueling hose according to claim 9, wherein the braid mesh is made of the same material as the sensing means.

12. The air to air refueling hose according to claim 9, wherein the support wire is helically wound along the internal structure between the braid mesh and the internal structure.

13. The air to air refueling hose according to claim 1, wherein both electrical terminals are arranged at one end of the hose.

14. The air to air refueling hose according to claim 1, wherein each electrical terminal is arranged at one end of the hose.

15. An aircraft comprising an air to air refueling hose according to claim 1.

16. An aircraft comprising an air to air refueling hose according to claim 1, wherein the aircraft comprises a monitoring system, the monitoring system being connected to the electrical terminals of the sensing means and being configured to measure the electrical continuity along the sensing means.

17. A method for detecting damage in an air to air refueling hose for an aircraft comprising:
an internal structure suitable for transporting fuel inside,
an intermediate structure arranged around the internal structure, and
an external structure arranged around the intermediate structure in such a way that the intermediate structure is located between the internal structure and the external structure, and
sensing means comprising electric conductors arranged along the air to air refueling hose and embedded inside of the external structure,
the method comprising the following steps:
a) providing an electrical current through the sensing means of the air to air refueling hose, and
b) measuring an electrical continuity along the sensing means,
wherein an electrical discontinuity in the measurement is indicative of a damage to the air to air refueling hose.

* * * * *